US012399491B2

(12) United States Patent
Lepreux et al.

(10) Patent No.: US 12,399,491 B2
(45) Date of Patent: Aug. 26, 2025

(54) CONTROL SYSTEM FOR CONTROLLING A DEVICE REMOTE FROM THE SYSTEM

(71) Applicant: SAFRAN ELECTRONICS & DEFENSE, Paris (FR)

(72) Inventors: Antoine Lepreux, Moissy-Cramayel (FR); Hugues Berthaud, Moissy-Cramayel (FR); Tiphaine Aigouy, Moissy-Cramayel (FR); Bastien Deloison, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 341 days.

(21) Appl. No.: 18/007,956

(22) PCT Filed: May 31, 2021

(86) PCT No.: PCT/EP2021/064585

§ 371 (c)(1),
(2) Date: Dec. 2, 2022

(87) PCT Pub. No.: WO2021/245038

PCT Pub. Date: Dec. 9, 2021

(65) Prior Publication Data

US 2023/0236594 A1 Jul. 27, 2023

(30) Foreign Application Priority Data

Jun. 4, 2020 (FR) ...................................... 2005859

(51) Int. Cl.
*G06F 3/01* (2006.01)
*G05D 1/00* (2006.01)

(52) U.S. Cl.
CPC .......... *G05D 1/0016* (2013.01); *G06F 3/015* (2013.01); *G06F 3/017* (2013.01)

(58) Field of Classification Search
CPC ....... G05D 1/0016; G06F 3/015; G06F 3/017; G06F 3/0346; G08C 2201/30; G08C 2201/32; G08C 17/02; H04Q 9/00
See application file for complete search history.

(56) References Cited

U.S. PATENT DOCUMENTS 9,691,287 B1 * 6/2017 Shapiro .................. G06F 3/017
10,507,917 B2 * 12/2019 Taylor ..................... G08G 5/57
(Continued)

FOREIGN PATENT DOCUMENTS

EP 1779820 A2 5/2007
EP 2945137 A1 11/2015
(Continued)

*Primary Examiner* — Huawen A Peng
(74) *Attorney, Agent, or Firm* — MUNCY, GEISSLER, OLDS & LOWE, P.C.

(57) ABSTRACT

A control system for controlling at least one remote device includes a communication module for transmitting control instructions to the remote device; a processor unit for generating said control instructions and sending them to said communication module; and a user interface for detecting information from a user. The user interface includes at least one muscle activity sensor for detecting muscular activity information from the user by measuring the electrical activity of at least one of the user's muscles, and the user interface generates muscular activity signals representative of detected muscular activity and sends them to the processor unit, and the processor unit generates the control instructions as a function of the muscular activity signals received by the processor unit.

16 Claims, 3 Drawing Sheets

(56) References Cited

U.S. PATENT DOCUMENTS

| | | | | |
|---|---|---|---|---|
| 2012/0092286 | A1 * | 4/2012 | O'Prey | G06F 3/0416 345/174 |
| 2014/0240103 | A1 | 8/2014 | Lake et al. | |
| 2015/0370333 | A1 * | 12/2015 | Ataee | G06F 3/015 345/156 |
| 2018/0097650 | A1 | 4/2018 | Lai et al. | |
| 2020/0310541 | A1 * | 10/2020 | Reisman | G06V 40/28 |
| 2021/0333807 | A1 * | 10/2021 | Feng | G05D 1/101 |

FOREIGN PATENT DOCUMENTS

| | | | |
|---|---|---|---|
| EP | 3465649 | A1 | 4/2019 |
| WO | WO2017207511 | A1 | 12/2017 |
| WO | WO2019108880 | A1 | 6/2019 |

* cited by examiner

CONTROL SYSTEM FOR CONTROLLING A DEVICE REMOTE FROM THE SYSTEM

The present invention relates to the field of control systems for enabling a user to control at least one remote device.

BACKGROUND OF THE INVENTION

By way of example, patent Document EP3465649A1, discloses a control system for controlling a remote device, specifically a drone, that enables the control of the remote device to be made secure by means of an interface that is ergonomic.

It is desirable to improve that type of control system so that the user interface is as ergonomic and as intuitive as possible.

Ideally, it should be possible to provide a control system that enables the user to control the remote device while also performing other tasks.

OBJECT OF THE INVENTION

An object of the present invention is to provide a control system for controlling at least one device that is remote from the system, the system solving the above-mentioned problems of the prior art, in full or in part.

SUMMARY OF THE INVENTION

To this end, the invention essentially provides a control system for controlling at least one remote device that is remote from the system, the control system comprising:

- a communication module for transmitting control instructions to said at least one remote device;
- a processor unit arranged to generate said control instructions and to send them to said communication module; and
- a user interface arranged to detect information coming from a user of the system.

The control system of the invention is essentially characterized in that the user interface comprises at least one muscular activity sensor arranged to detect muscular activity information from the user by measuring electrical activity of at least one of the user's muscles, said user interface being arranged to generate muscular activity signals and to transmit them to the processor unit, which muscular activity signals are representative of muscular activity information detected by said at least one muscular activity sensor, the processor unit being arranged to receive said muscular activity signals and so that said control instructions generated by the processor unit are a function of the muscular activity signals received by the processor unit.

By enabling control instructions for the remote device to be generated via at least one measurement of electrical activity of at least one of the user's muscles and via the muscular activity signals associated with such a measurement, the user no longer needs to hold a control in the hand in order to press on a control button, so the user's hands can be kept free. It is muscle contraction itself that is interpreted directly in order to create the control instruction, and not the force or a gesture resulting from that contraction.

This is particularly advantageous since the user retains full control over his or her hands, and the user needs only to control the muscle(s) whose electrical activity is being measured by the sensor in order to generate and transmit control instructions for the attention of said at least one remote device.

In another aspect, the invention provides equipment comprising:

- both a control system in accordance with any of the embodiments of the control system of the invention; and
- also at least one remote device remote from the system, the remote device being arranged to interact with the communication module and to receive said command instructions transmitted by the communication module and to execute at least some of the command instructions received by the device remote from the control system.

The equipment of the invention presents the advantages mentioned above for the control system of the invention.

In a particular embodiment of the equipment of the invention, said at least one remote device is selected from a group of remote devices comprising a drone, a robot, and a module for piloting an aircraft transporting the user of the system.

It can be understood that the control system of the invention is compatible with controlling various kinds of remote device such as a drone, a robot, a machine tool, a module for driving a vehicle, or a module for piloting an aircraft.

In an embodiment of the equipment of the invention in which the remote device is a piloting module for piloting an aircraft, the aircraft may have on board the user, the control system of the invention, and the piloting module. Under such circumstances, the piloting module forms part of the avionics of the aircraft, thereby enabling the user to cause the aircraft to perform actions by means of the control system of the invention and the piloting module.

In another aspect, the invention provides an aircraft including:

- both a control system in accordance with any of the embodiments of the control system of the invention; and
- also a remote device comprising a module for piloting the aircraft;
- the user interface being on board the aircraft to enable a user of the system placed in the aircraft (specifically in the cockpit of the aircraft) to pilot the aircraft via the control system of the invention and its at least one muscular activity sensor, the module for piloting the aircraft being connected to avionics of the aircraft to transmit said control instructions that are generated by the processor unit to the avionics, the control instructions being selected by the control unit from a predefined list of control instructions as a function of muscular activity signals generated from muscular activity information detected by said at least one muscular activity sensor.

By way of example, the predefined list of control instructions comprises instructions for taking off, landing, climbing, descending, moving forwards, turning to the right, turning to the left, stopping one or more pieces of equipment of the aircraft (e.g. stopping engines), and carrying out a predefined action such as dropping an object.

Thus, measuring the electrical activity of certain muscles of the user can be used to enable the user to select predefined control instructions in a list.

By predefining a list of simple instructions, the user can control the execution of those instructions without needing to exert precise control over muscular activity. The user can always carry out other tasks, specifically a such as piloting the aircraft while keeping hands on the manual flight controls, while also simultaneously sending instructions to the avionics of the aircraft by means of contractions giving rise to changes in the electrical activity of certain muscles of the user.

In another aspect, the invention provides apparatus including both a control system in accordance with any of the embodiments of the invention and also a remote device comprising a module for operating the apparatus, the user interface being arranged to enable a user of the system to operate the apparatus via the control system and its at least one muscular activity sensor, the module for operating the apparatus being connected to control electronics of the apparatus to transmit said control instructions that are generated by the processor unit to the control electronics of the apparatus, the control instructions being selected by the control unit from a predefined list of control instructions as a function of muscular activity signals generated from muscular activity information detected by said at least one muscular activity sensor.

Preferably, this apparatus is apparatus from the group of apparatuses comprising a car, a machine, a robot, a weapon, or any apparatus including control electronics, a physical interface for physical control that can be activated by the user, and actuators (i.e. any apparatus that can be virtualized).

BRIEF DESCRIPTION OF THE DRAWINGS

Other characteristics and advantages of the invention appear clearly from the following description that is given by way of nonlimiting indication and with reference to the accompanying drawings, in which.

DETAILED DESCRIPTION OF THE INVENTION

Figure 1:
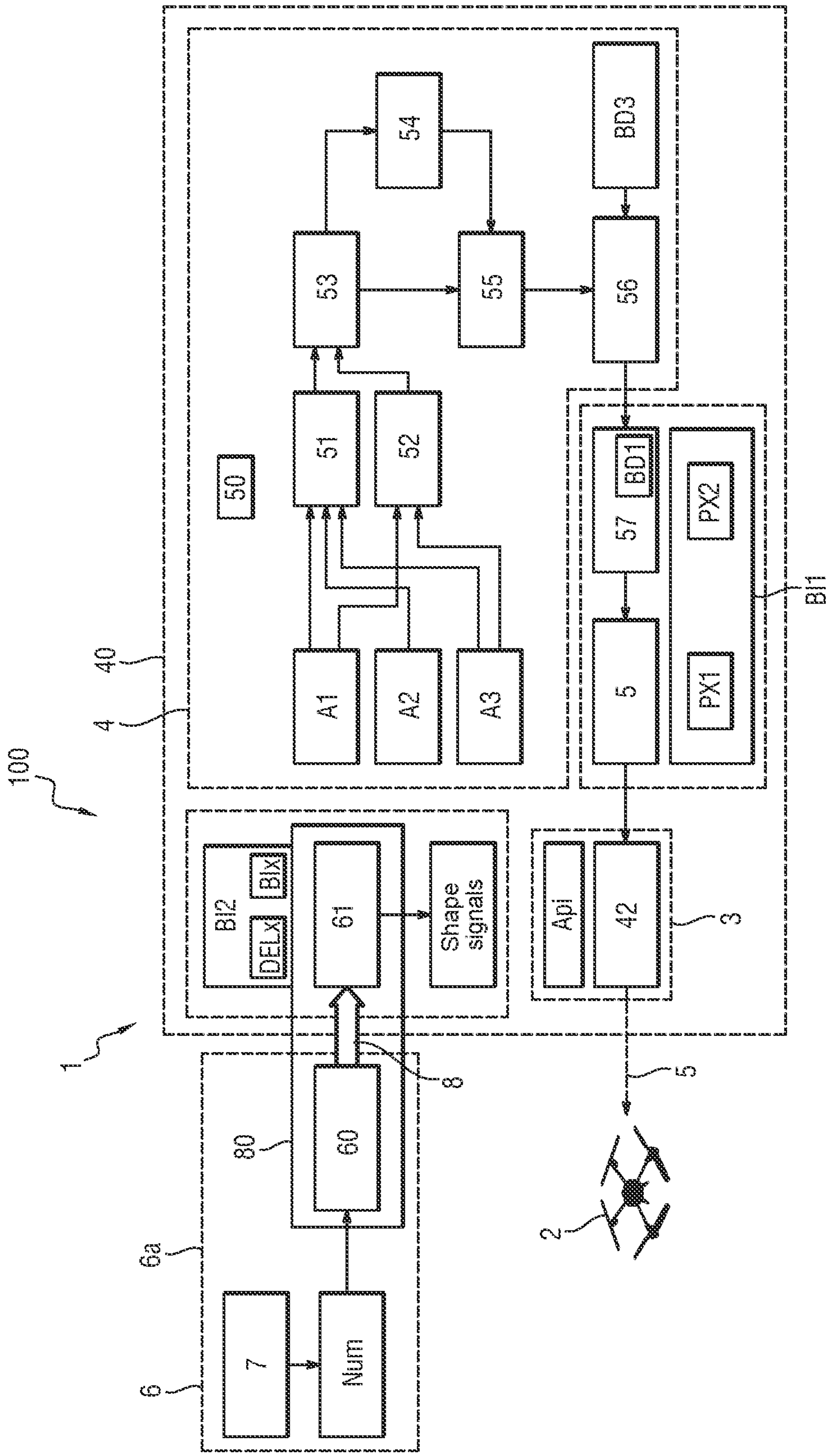
FIG. 1 shows the general architecture of equipment 100 of the invention.
Figure 2:
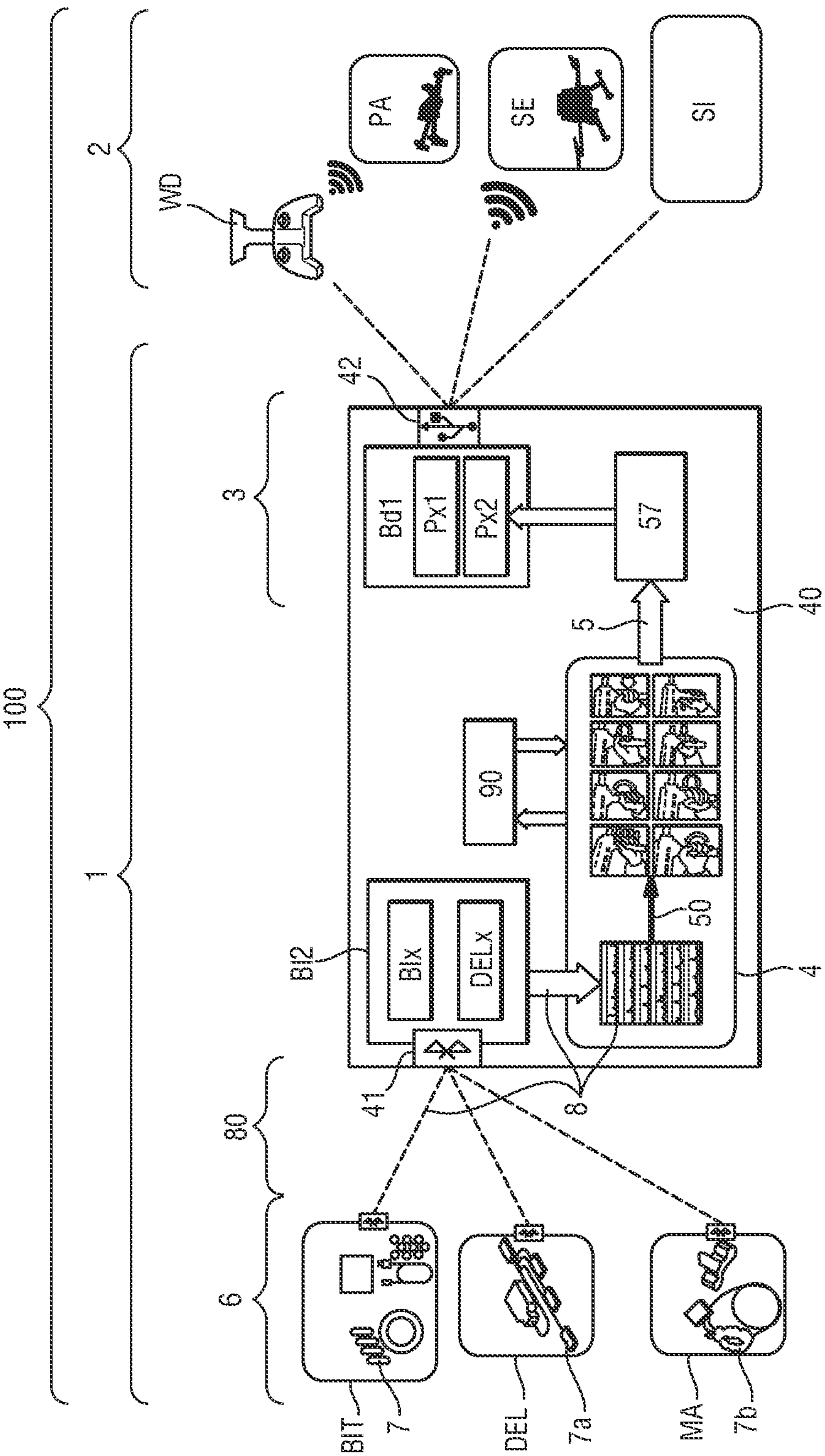
FIG. 2 is an organic view of the FIG. 1 equipment putting emphasis on a setup and calibration module of the system of the invention.

With reference to FIGS. 1 and 2, the invention relates to a control system 1 for controlling at least one device 2 that is remote from the system.

The control system 1 comprises:

- a communication module 3 for transmitting control instructions 5 to said at least one remote device 2;
- a processor unit 4 arranged to generate said control instructions 5 and to send them to said communication module 3; and
- a user interface 6 arranged to detect information coming from a human user of the system.

The communication module is preferably arranged to transmit the control instructions 5 to said at least one remote device 2 over a wireless connection.

Specifically, the wireless connection is preferably communication using a Wi-Fi or a Wi-Fi direct (WD) protocol, or possibly using a Bluetooth communication protocol.

In other words, the processor unit 4 is functionally connected to said communication module 3 in order to transmit control instructions 5 to said at least one remote device 2 via the communication module 3.

The user interface 6 has at least one muscular activity sensor 7, 7*a*, 7*b* arranged to detect information about muscular activity of the user by measuring electrical activity of at least one of the user's muscles.

This measurement is taken by a portion of the sensor contacting a surface of the user's skin in register with said at least one of the user's muscles that is to have its activity measured.

The user interface 6 is arranged to generate muscular activity signals 8 and to transmit them to the processor unit 4, which muscular activity signals 8 are representative of muscular activity information detected by said at least one muscular activity sensor. To do this, the user interface may include a module NUM for pre-processing and/or digitizing the signal 8.

The user interface 6 is arranged to transmit the muscular activity signals 8 to the processor unit 4 by wireless communication 80.

Specifically, this wireless communication 80 is preferably communication using a Bluetooth communication protocol or possibly a Wi-Fi or Wi-Fi direct protocol, or any other wireless communication protocol that is secure and preferably encrypted.

To do this, the user interface 6 includes at least one wireless telecommunication module 60 for transmitting the signals 8 to the processor unit 4.

In this example, the module 60 is a Bluetooth module, however other types of module and wireless communication protocols other than Bluetooth could be envisaged.

Alternatively, it is possible to envisage this communication being wired, e.g. a wired universal serial bus (USB) connection, in order to limit any risk of the communication between the user interface 6 and the processor unit 4 being intercepted.

The processor unit 4 is arranged to receive said muscular activity signals 8.

For this purpose, the user interface 4 includes at least one wireless telecommunication module 61 for transmitting the signals 8 coming from the user interface 6.

In this example, the module 61 is a Bluetooth module, however other types of module and wireless communication protocols other than Bluetooth could be envisaged.

As mentioned above, it is possible to envisage that communication between the modules 60 and 61 is wired.

The processor unit 4 is also arranged so that said control instructions 5 generated by the processor unit 4 are functions of the muscular activity signals 8 received by the processor unit.

The user interface 6 has a plurality of muscular activity sensors 7, 7*a*, 7*b*, with said at least one muscular activity sensor 7 forming part of this plurality of sensors.

Each of the sensors of this plurality of sensors is arranged to be able to detect information about muscular activity of the user by measuring electrical activity of at least one of the user's muscles. The sensors in the plurality of sensors are spaced apart from one another in order to detect the activity of different muscles or of different groups of muscles.

The muscular activity sensors 7, 7*a*, 7*b* of this plurality of sensors are sensors for sensing electrical activity of a plurality of muscles.

Each of the sensors preferably comprises a plurality of electrodes that are spaced apart from one another in order to detect electrical characteristics and/or activities at a plurality of points that are spaced apart from one another on the surface of the user's skin, thereby obtaining an accurate representation of muscular activity.

The characteristics of electrical activity as generated by the muscular activity of one or more muscles of the user may be voltages, currents, energies, and combinations of the characteristics.

It is also possible for at least some of the sensors of this plurality of sensors (including said at least one muscular activity sensor 7, 7*a*, 7*b*) to be arranged to sense the activity of a plurality of the user's muscles simultaneously.

Such a sensor 7, 7*a*, 7*b* is known as a "myoelectric" sensor. Sensing is performed by electromyography (EMG). Preferably each contraction or group of contractions corresponds to an instruction for transmitting to the remote device 2.

In addition to such a sensor for sensing the electrical activity of at least one muscle, it would also be possible to make use of a sensor arranged to measure mechanical tension of at least one of the user's muscles.

Such a sensor is a muscle tension and/or muscle force sensor that is capable of detecting muscular tension of at least one of the user's muscles.

The electrical activity sensors are arranged to detect variations in the electrical activity of the muscles as generated by the user controlling the muscle tension of said muscles while keeping still.

This is particularly advantageous for being able to generate control instructions for the attention of the remote device while the user does not move. This is advantageous when the user desires to remain inconspicuous for when the user is performing other tasks that require the user to keep still or when the user's hands are busy holding an object.

When the user interface 6 has one or more sensors each provided with a plurality of electrodes, the interface 6 is preferably arranged to detect information about the muscular activity of a plurality of muscles simultaneously in order to be able to perform detailed analysis of the electrical activity of each of the muscles.

The user has considerable capacity for interacting with the user interface, since the user can choose which muscles to contract and how hard they are to be contracted, thereby making it possible to generate a wide variety of muscular activity signals.

Each muscular activity signal forms a unique signature that is recognizable and reproducible for the user.

It is thus possible to associate a control instructions 5 with such a reproducible muscular activity signal 8 so as to enable the user to control the remote device 2 merely by contracting some of the user's muscles.

The processor unit 4 and the communication module 3 in this example are incorporated in a single portable electronic appliance 40, i.e. an appliance of maximum dimensions that are of the order of a few tens of centimeters and of maximum weight that is a few hundreds of grams (g), and preferably less than 2 kilograms (kg).

Such an appliance 40 includes at least one processor together with memories containing computer programs for performing the data and signal processing needed to enable the processor unit 4 and a communication module 3 to operate.

The appliance 40 also includes communication electronic circuit cards 41 and 42 for communicating both with the sensor(s) (specifically in this example a Bluetooth receiver card 41 optionally including a Bluetooth transmitter function) and also with said at least one remote device (specifically in this example a Wi-Fi or Wi-Fi direct or Bluetooth transmitter card 42).

The appliance 40 may also be fitted with a power supply (e.g. a storage battery) for powering and operating it, and also with a screen or display means for displaying parameters or functions or information transmitted by said at least one sensor 7 and/or by said at least one remote device 2 (e.g. views taken by an optical sensor on board the remote device 2).

In this example, the appliance 40 is an electronic tablet having a screen, however it could be a mobile telephone, a laptop computer, or a personal assistant. In this example, the appliance 40 is a Crosscall®, Trekker-X4® mobile telephone or smartphone, but it could also be any control unit having user interaction means and the ability to perform calculations.

In a particular embodiment of the system 1 of the invention, the processor unit 4 is arranged to select said generated control instructions 5 from a predefined list of control instructions that are distinct from one another, e.g. comprising instructions are for taking off, landing, climbing, descending, going forwards, turning right, turning left, stopping one or more pieces of equipment of an aircraft (e.g. stopping the motors of the aircraft), and carrying out a predefined action (e.g. dropping an object).

This predefined list of control instructions 5 is preferably stored in a specific memory zone of the processor unit and it is preferably adaptable by means of a setup/calibration interface 90 of the control unit.

In this example, the processor unit 4 is arranged to perform said selection of generated control instructions 5 from the predefined list of control instructions as a function of at least some of the muscular activity signals 8 received by the processor unit 4.

In order to limit any risk of error when selecting instructions, the processor unit 4 may be arranged to select a current control instruction 5 from a predefined sequence of instructions 5, which current control instruction is contained in the sequence, and then to send it to the communication module 3 for it to be executed by said at least one remote device 2 (the current control instruction 5 being an instruction generated by the processor unit 4).

In this example, the processor unit is arranged to perform this selection of the current control instruction as a function of at least some of the muscular activity signals 8 received by the processor unit 4.

A sequence of instructions lists a series/succession of control instructions to be executed one after another in an order defined by the sequence, and in general the instructions of a sequence are executed one after another in the order in which they are written in sequence.

The predefined control instruction sequence is preferably stored in a specific memory zone of the processor unit 4 and it is preferably adaptable by means of the setup/calibration interface 90 of the control unit 4.

By providing a sequence, the chances of confusion in selecting instructions are limited, since the processor unit seeks to identify only one muscular activity signal at any one instant, i.e. the signal corresponding to the following instruction in the sequence. The risk of confusion between signals is thus greatly reduced, since during setup, the user can ensure that the previously-stored parameters for successive instructions correspond to performing gestures that are very different from one another and that gave rise to respective signals that cannot be confused.

As can be understood from FIGS. 1 and 2, the processor unit 4 is arranged to analyze the signals 8 it receives and to determine/generate a succession of datasets 50 on the basis of those signals 8.

Consequently, this succession of datasets 50 is representative of a succession of gestures performed by said user.

The term "gesture" is used herein to mean a given muscle contraction, it being understood that the given muscle contraction need not necessarily give rise to any movement of any jointed bone of the user.

In this sense, a gesture is information about the muscular activity of one or more of the user's muscles and that need not necessarily be accompanied by any change of the user's posture.

Preferably, and as shown in FIG. 1, the processor unit 4 is arranged:

- to execute at least one analysis A1, A2, A3 of the muscular activity signals 8 received by the processor unit 4, this at least one analysis being selected from a spectral analysis A1, a spatial analysis A2, a time analysis, and an analysis combining at least some of said spectrum, spatial, and time analyses; and
- to determine said succession of datasets 50 as a function of the result of said at least one analysis of the muscular activity signals received by the processor unit.

By way of example, a spectral analysis may be an analysis that consists in defining a signal as a function of its amplitude and/or of its frequency and/or of its period. Spectral analysis of a signal serves to recognize characteristics and/or a signature specific to that signal.

By way of example, a spatial analysis may be an analysis that consists in defining a signal as a function of the spatial arrangement of the muscles whose muscular activity has been picked up. The spatial analysis of a signal serves to recognize characteristics and/or a signature specific to a particular gesture that concerned to generate the particular signal.

By way of example, a time analysis is an analysis that consists in recognizing the duration of at least some of the components of a signal, or in recognizing time synchronization between those components, or in recognizing the moments/durations of those components. Time analysis can also serve to obtain a signature specific to the signal that is entirely recognizable for a given gesture.

Combining these various spatial, time, and spectral analyses makes it possible to obtain signatures that are specific to each signal in order to distinguish better between two signals, thereby reducing any risk of error in interpreting and recognizing these signals in order to select the control instruction that corresponds to the user's wishes and to the gesture performed by the user. The processor unit 4 is preferably arranged to carry out gesture correlation analysis that comprises processing the data of said succession of datasets 50 in order to identify among those datasets a first data group 51 that is representative of mutually correlated simple user gestures and a second data group 52 that is representative of mutually correlated complex user gestures, the processor unit also being arranged to identify whether at least some of the data in the first and second data groups corresponds to a previously-stored group of parameters contained in a database BD1, in application of predetermined correspondence rules between the data groups and the previously-stored groups of parameters contained in the database.

The database BD1 contains a plurality of previously-stored groups of parameters and a plurality of previously-stored control instructions (i.e. previously-stored control instructions for said at least one remote device).

Each of the previously-stored control instructions is associated with a single one of the previously-stored groups of parameters.

Each previously-stored group of parameters is stored during a stage of setting up the control system, in which the user performs setup gestures while detecting the muscular activity information in order to store the muscular activity signals that correspond to the gestures.

Setup gestures may be simple setup gestures or complex setup gestures and/or a combination of simple and/or complex setup gestures.

Simple gestures are gestures associated with varying muscular activity of a limited number of given muscles of the user, which number is less than or equal to a predetermined integer value.

In other words:

- if the variation in muscular activity relates to a number of given muscles that is less than or equal to the predetermined integer value; and/or
- if the variation in activity is associated with muscular contraction of an intensity that is less than or equal to a maximum electrical value that is predetermined for given muscles of the user; and/or
- if the variation in activity is associated with muscular contraction of a duration that is less than or equal to a value for muscular contraction duration that is predetermined for given muscles of the user; then it can be considered that the gesture is a simple gesture.

In contrast, complex gestures are gestures associated with variation in muscular activity of a number of given muscles of the user that is greater than said predetermined integer value and/or associated with muscular contraction of intensity greater than said predetermined maximum value and/or associated with a duration of muscular contraction that is greater than said predetermined value for muscular contraction duration and/or associated with a plurality of simple gestures performed consecutively so as to create a gesture sequence (where the gesture sequence is identified as being a complex gesture), then it can be considered that the gestures are complex gestures.

Other rules may be envisaged for distinguishing between simple gestures and complex gestures.

During the setup/calibration stage, the processor unit makes use of muscular activity signals that correspond to setup gestures performed by the user to generate previously-stored parameter groups and to store them in the database, with each previously-stored parameter group being associated with a previously-stored control instruction 5 in the same database BD1.

The user can thus associate each control instruction 5 for the remote device that is stored in the database BD1 with a setup gesture or with a combination of setup gestures.

When the user performs a gesture or a combination of gestures approximating to the setup gesture or to the combination of setup gestures, the processor unit 4 then uses its analysis of the signals 8 to generate data 50 that corresponds to one of the parameter groups previously-stored in the database BD1.

The processor unit 4 identifies/detects this match between the data 50 that it has generated and the previously-stored parameters group in the database BD1, and then transmits the corresponding control instruction 5 to the communication module 3 so that the module re-transmits the control instruction to the remote device in order to execute it.

It should be observed that the processor unit may also add to this analysis by merging the gesture correlations 53 with a context, which may either be a time context (a moment in a process of controlling the remote device), or a historical context (as a function of previously-identified gestures or of different gestures performed at the same time) or a sequential context (as a function of previously-transmitted instructions or of instructions that are to be transmitted in a sequence of instructions).

For this purpose, the processor unit can also store a history of the analyses that have been performed and/or of the analysis results that have been obtained and/or of the instructions that have been transmitted and/or of contexts. In the present example, as a function of the result of merging these gesture correlations 53, the processor unit stores the contexts in order to obtain a historical record 54 of the contexts.

As a function of merging these correlations 53 and of the historical record 54 of the contexts, the processor unit can determine the current gesture(s) being performed by the user.

As can be understood from FIG. 1, the processor unit is functionally connected to a database BD3 of involuntary gestures containing a plurality of previously-stored groups of undesirable parameters.

Since each group of undesirable parameters is associated with involuntary gestures of the user and since the processor unit is arranged to make use of said groups of undesirable parameters contained in the database BD3 of involuntary gestures, the processor unit identifies muscular activity signals that are representative of undesirable gestures and extracts the data corresponding to these muscular activity signals representative of undesirable gestures from a useful data stream that is used by the processor unit 4 to generate said control instructions and to send them to said communication module.

The extracted data that corresponds to involuntary gestures as detected in this way are extracted by a function referred to as an involuntary gesture rejection function 56.

Depending on circumstances, the term "useful datastream" specifies:

either the data used to determine said succession of datasets as a function of said at least one analysis of the muscular activity signals received by the processor unit (the useful datastream then being generated by extracting the data corresponding to undesirable gestures as from the beginning of the analysis of the muscular activity signals); or else the data coming from at least one of said first and second data groups respectively representative of simple gestures and of mutually correlated complex gestures performed by the user (the useful datastream then being generated by extracting the data corresponding to undesirable gestures from a datastream generated by the analysis of gesture correlation.

Each previously-stored group of undesirable parameters may be stored during a stage of setting up the control system, in which the user performs setup gestures while detecting the muscular activity information in order to store the muscular activity signals that correspond to the undesirable gestures.

It is also possible for the database BD3 of involuntary gestures to be prepared by observing the muscular activity of a plurality of users during a plurality of exercises using the system of the invention.

Involuntary gestures may be simple gestures or complex gestures and/or a combination of simple and/or complex gestures. In this setup stage, the processor unit uses the muscular activity signals that correspond to involuntary gestures in order to generate groups of undesirable parameters, and it stores them in the database of involuntary gestures.

When the user performs an involuntary gesture or a combination of involuntary gestures, the processor unit generates data corresponding to one of the groups of undesirable parameters previously stored in the database. The processor unit 4 identifies this match between the data that it has generated and the previously-stored group of undesirable parameters, and it eliminates the data corresponding to the involuntary gestures (module 56).

This serves to simplify analysis of the signals since only data that is associated with gestures that are not involuntary gestures are conserved for analysis in order to detect whether these data do or do not include a dataset approximating to a group of previously-stored parameters associated with a control instruction. As can be understood from FIG. 1, the datastream cleared of the data corresponding to involuntary gestures is then transmitted to a control instruction manager 57 forming part of the processor unit 4.

Specifically, it is the control instruction manager 57 that identifies whether at least some of the data in the cleared datastream corresponds to a group of previously-stored parameters contained in the database BD1. In this example, the database BD1 is incorporated in the control instruction manager 57, however it could be external to the processor unit 4 while being functionally connected to the processor unit 4.

If the control manager 57 detects data specific to a current voluntary gesture being performed by the user and corresponding to one of the groups of parameters previously stored in the database BD1, then it selects the associated control instruction 5 from the database and generates the instruction so as to send it to the communication module 3. Otherwise, no instruction is generated and transmitted to the communication module 3. The system 1 also has a first library BI1 of mutually distinct software drivers PX1, PX2.

At least one of the software drivers PX1, PX2 in the first library BIL is arranged to interact with said at least one remote device 2 in order to send it said control instructions, while others of the drivers may potentially be unsuitable for interacting with said at least one remote device while being arranged to interact with remote devices other than said at least one remote device.

Such a first library enables the system of the invention to be compatible with numerous remote devices of different types, thereby enabling the system to be adapted simply to any one of the remote devices that are commercially available.

Thus, it is possible to have drivers adapted to remote devices of different brands such as PARROT®, PARROT ANAFI® (PA), SQUADRONE®, SQUADRONE EQUIPIER® (SE), or piloting simulators (SI) remote from the processor unit, such as a flight simulator or a drone-control simulator or a simulator controlling some other controllable vector via such a software driver.

It should be observed that the communication module 3 can execute application programming interfaces Api, such as software drivers specific to the remote device(s) 2 to be controlled.

Likewise, the system 1 may also include a second library BI2 of mutually distinct software drivers BIx, DELx.

At least one of the software drivers BIx, DELx of the second library BI2 is arranged to interact with said at least one muscular activity sensor 7 in order to enable the user interface 6 to receive muscular activity information detected by said at least one sensor 7, while others of the software drivers BIx, DELx of the second library BI2 may potentially be unsuitable for interacting with said at least one muscular activity sensor 7, being arranged to interact with muscular activity sensors 7*a*, 7*b* other than said at least one muscular activity sensors 7.

Such a second library BI2 enables the system 1 of the invention to be compatible with numerous muscular activity sensors 7, 7*a*, 7*b* of different types and/or from different manufacturers.

This enables the system 1 to be adapted simply to any of the sensors that are commercially available. Thus, it is possible to have software drivers BIT, DEL, MA respectively adapted to sensors and/or pieces of sensing equipment of different brands BITalino® (BIT), Delsys® (DEL), or to other sensors and/or pieces of equipment (MA) specific to the system of the invention. Finally, the user interface 6 includes at least one accessory 6*a* that is arranged to be worn, possibly attached and/or glued, on a part of the user.

This at least one accessory 6*a* incorporates said at least one muscular activity sensor 7 and electrodes of the sensor in order to pick up muscular activity from the surface of the user's skin.

This accessory 6*a* also incorporates a telecommunication module 60 for transmitting said muscular activity signals 8 to the processor unit 4.

Typically such an accessory 6*a* is selected from a group of accessories comprising a glove, a bracelet, and a headband.

The advantage of having a bracelet is that the user's hands remain free, and merely contracting muscles in the forearm suffices to enable the user to generate a control instruction for the remote device.

Figure 3:
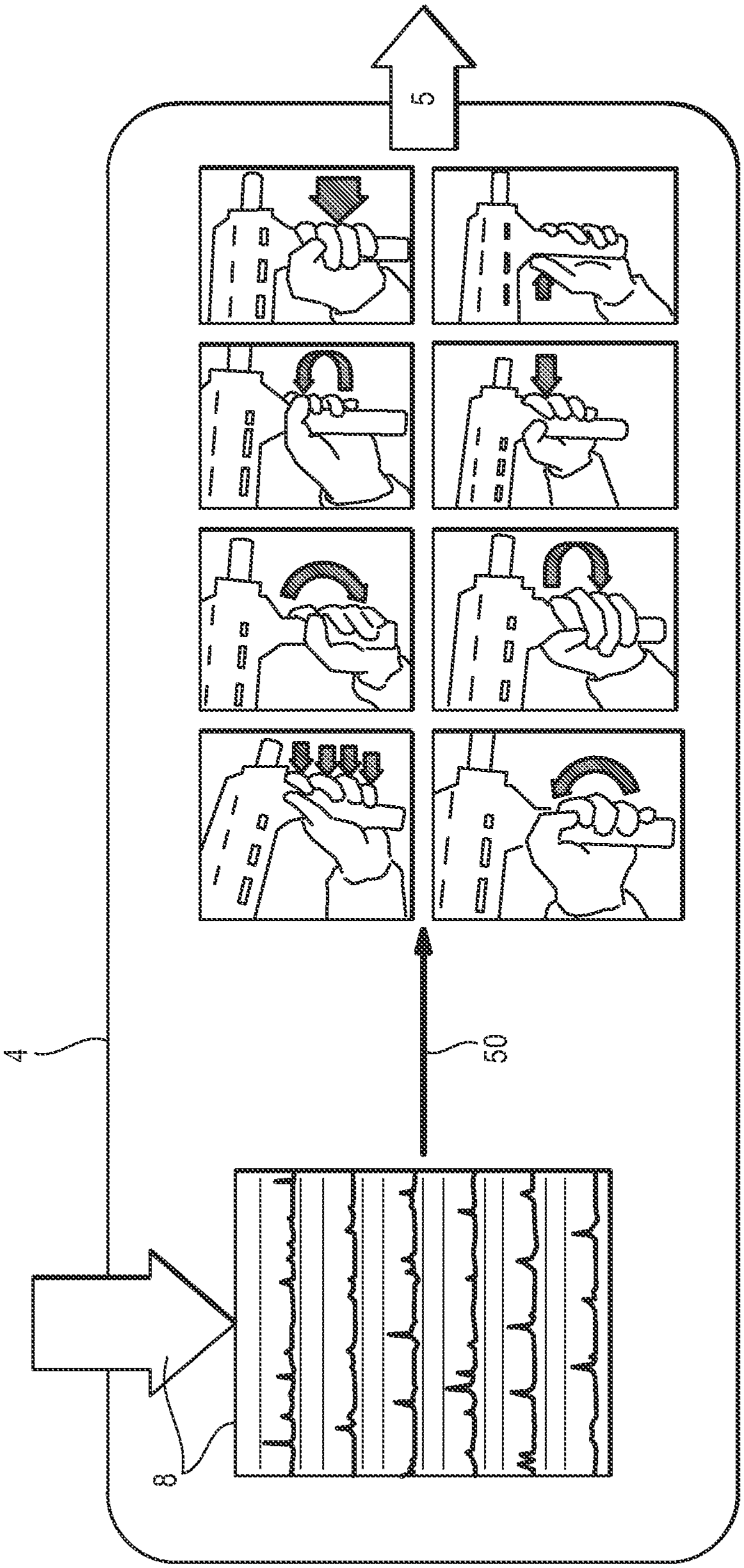
FIG. 3 is a detail view of a processor unit of the system of the invention.

This kind of control is particularly unobtrusive since the user can generate the control instruction merely by contracting one or more muscles without any need to move a hand or a finger or a wrist or a forearm. By way of example, the detail view of FIG. 3 shows eight images illustrating how the user can hold an object, specifically a gun, and then practically without moving either hand relative to that object, the user can exert a multitude of muscular contractions, each of which generates muscular activity signals 8 that are mutually distinct and entirely reproducible in various different environments and at different moments.

These images are images stored during setup under the control of the setup module 90.

Each image shows a particular gesture that enables a group of parameters to be generated that are specific to that gesture. These groups of parameters are stored in the database BD1 that associates a respective control instruction with each of these groups of parameters.

Thus when reading the images from left to right and then from the top row to the bottom row, there can be seen:

- a first image in which the user grips the object with four fingers;
- a second image in which the user generates a first torque on the object about an axis perpendicular to the longitudinal axis of the user's hand and going from an inside face to an outside face of the wrist;
- a third image in which the user generates a second torque on the object about an axis perpendicular to the longitudinal axis of the user's hand and going from an outer side face to an outer side face of the wrist;
- a fourth image in which the user grips the object with all five digits;
- a fifth image (left-hand image in the second row of images) in which the user generates torque opposite to said first torque of the second image;
- a sixth image in which the user generates torque opposite to said second torque of the third image;
- a seventh image in which the user generates a traction force on the object going towards the user's body; and
- an eighth image in which the user generates a thrust force on the object going away from the user's body.

It can be seen that, without moving the hand, the user can exert a wide variety of gestures and associated muscular forces, generating muscular signals that are very particular and recognizable by the processor unit 4. This solution is operationally acceptable to the user (e.g. a combatant) since the user's entire attention is not pre-occupied with operating the control system, since the user does not need to hold a specific remote control (less weight), and since the user benefits from being ready for the job in hand and for the surroundings.

Another advantage of this solution is to reduce the cognitive load of the user (because use of the system is particularly intuitive, given the application's user path and gesture analysis).

The gestures associated with controlling the remote device are preferably selected to be specific to such control without any risk of interference with other gestures normally useful to the mission.

By means of the invention, the user can remain silent (which would be possible with voice control) and still (which would not be possible with a touch-sensitive remote control requiring hand movements).

The system of the invention is simple to set up so as to be compatible with the surroundings in which it is to be used.

Naturally, the invention is not limited to the embodiments described, but covers any variant coming within the ambit of the invention as defined by the claims.

In particular, although the invention is described in association with using a gun, the invention is applicable to a user holding any other type of object, or on the contrary not holding an object at all.

Likewise, although the above-described control interface acts essentially by measuring muscular activity, it is also possible for the user interface 6 to include at least one movement sensor (e.g. one or more accelerometers and/or one or more gyros) arranged to detect characteristics of movements made by the user who is carrying the user interface (e.g. accelerations or orientations). In this embodiment, the user interface 6 is arranged to generate and transmit to the processor unit 4 signals that are representative of movements detected by said at least one movement sensor, with the processor unit 4 being arranged to receive said signals representative of movements and so that said control instructions 5 generated by the processor unit 4 are a function of both the muscular activity signals 8 received by the processor unit and also of said signals representative of movements.

Using electromyography in association with the movement signals, i.e. inertial signals acquired by the accelerometers and gyros of the user interface (by way of example, the user interface may be in the form of one or more bracelets incorporating gyros and/or accelerometers), makes it possible to diversify the types of measurements that are taken and thus to enrich the control capabilities that are made available to the user.

The movement/inertial signals are processed in the same way as that described above for the muscular activity signals.

Combining user muscular activity signals with user movement signals serves to enrich the data group for comparison with the previously-stored parameter groups contained in the database BD1.

The user can thus set up the system so as to enable the user to control the remote device:

to execute certain actions as a result of muscular activity alone, without making any movement;

to execute other actions by means of a combination of muscular activity associated with one or more coordinated movements (turning movements and/or movements in translation); and possibly to execute specific actions solely by means of movements.

The invention claimed is:

1. A control system for controlling at least one remote device that is remote from the system, the control system comprising:

a communication module for transmitting control instructions to said at least one remote device;

a processor unit arranged to generate said control instructions and to send them to said communication module; and a user interface arranged to detect information from a user of the system, the user interface comprising at least one muscular activity sensor arranged to detect muscular activity information from the user by measuring electrical activity of at least one of the user's muscles, and said user interface being arranged to generate muscular activity signals and to transmit them to the processor unit, which muscular activity signals are representative of muscular activity information detected by said at least one muscular activity sensor, the processor unit being arranged to receive said muscular activity signals and so that said control instructions generated by the processor unit are a function of the muscular activity signals received by the processor unit, wherein the processor unit is functionally connected to a database of involuntary gestures containing a plurality of groups of previously-stored undesirable parameters, each group of undesirable parameters being associated with involuntary gestures of the user and the processor unit is arranged to make use of said groups of undesirable parameters contained in the database of involuntary gestures, and wherein the processor unit identifies muscular activity signals that are representative of undesirable gestures and extracts data corresponding to these muscular activity signals representative of undesirable gestures from a useful datastream, which useful datastream is used by the processor unit to generate said control instructions and to send them to said communication module.

2. The control system according to claim 1, wherein the user interface includes a plurality of muscular activity sensors, said at least one muscular activity sensor forming part of said plurality of sensors, the plurality of sensors being arranged to be capable of detecting muscular activity information from the user by measuring electrical activity of a plurality of the user's muscles that are spaced apart from one another.

3. The control system according to claim 1, wherein the user interface is arranged to transmit the muscular activity signals to the processor unit by a wireless connection.

4. The control system according to claim 1, wherein the processor unit is arranged to select said generated control instructions from a predefined list of control instructions comprising instructions for taking off, landing, climbing, descending, moving forwards, turning to the right, turning to the left, stopping one or more pieces of equipment of an aircraft, and carrying out a predefined action, the processor unit being arranged to make said selection of generated control instructions from the predefined list of control instructions as a function of at least some of the muscular activity signals received by the processor unit.

5. The control system according to claim 1, wherein the processor unit is arranged to select a current control instruction from a predefined sequence of control instructions and to send it to the communication module in order to be executed by said at least one remote device, the processor unit being arranged to select the current control instruction as a function of at least some of the muscular activity signals received by the processor unit.

6. The control system according to claim 1, wherein the processor unit is also arranged to determine a succession of datasets, the succession of datasets being representative of a succession of gestures performed by said user.

7. The control system according to claim 6, wherein the processor unit is:

arranged to execute at least one analysis of the muscular activity signals received by the processor unit, the at least one analysis being selected from spectral analysis of the muscular activity signals received by the processor unit, spatial analysis of the muscular activity signals received by the processor unit, time analysis of the muscular activity signals received by the processor unit, and analysis combining at least some of said spectral, spatial, and time analyses; and arranged to determine said succession of datasets as a function of said at least one analysis of the muscular activity signals received by the processor unit.

8. The control system according to claim 6, wherein the processor unit is arranged to carry out gesture correlation analysis that comprises processing the data of said succession of datasets in order to identify among those datasets a first data group that is representative of mutually correlated simple user gestures and a second data group that is representative of mutually correlated complex user gestures, the processor unit also being arranged to identify whether at least some of the data in the first and second data groups corresponds to a previously-stored group of parameters contained in a database, the database containing a plurality of previously-stored groups of parameters and a plurality of previously-stored control instructions, each of the previously-stored control instructions being associated with a single one of the previously-stored groups of parameters.

9. The control system according to claim 1, including a first library of mutually distinct software drivers, at least one of the software drivers in the first library being arranged to interact with said at least one remote device in order to send it said control instructions, and others of the drivers being unsuitable for interacting with said at least one remote device and being arranged to interact with remote devices other than said at least one remote device.

10. The control system according to claim 1, including a second library of mutually distinct software drivers, at least one of the software drivers of the second library being arranged to interact with said at least one muscular activity sensor in order to enable the user interface to receive muscular activity information detected by said at least one sensor, and others of the software drivers of the second library being unsuitable for interacting with said at least one muscular activity sensor, and being arranged to interact with muscular activity sensors other than said at least one muscular activity sensors.

11. The control system according to claim 1, wherein the user interface includes an accessory arranged to be worn on a part of the user, the accessory incorporating said at least one muscular activity sensor and a telecommunication module for transmitting said muscular activity signals the processor unit.

12. The control system according to claim 1, wherein the user interface includes at least one movement sensor arranged to detect characteristics of movements carried out by the user wearing the user interface, the user interface being arranged to generate signals representative of movements detected by said at least one movement sensor and to transmit them to the processor unit, the processor unit being arranged to receive said signals representative of movements and so that said control instructions generated by the processor unit are a function of the muscular activity signals received by the processor unit and of said signals representative of movements.

13. Equipment comprising both a control system according to claim 1 and also at least one remote device remote from the system, the remote device being arranged to interact with the communication module and to receive said command instructions transmitted by the communication module and to execute at least some of the command instructions received by the device remote from the control system.

14. The equipment according to claim 13, wherein said at least one remote device is selected from a group of remote devices comprising a drone, a robot, a machine tool, a module for driving a vehicle, and a module for piloting an aircraft transporting the user of the system.

15. An aircraft including both a control system according to claim 1 and also a remote device comprising a module for piloting the aircraft, the user interface being on board the aircraft to enable a user of the system placed in the aircraft to pilot the aircraft via the control system and its at least one muscular activity sensor, the module for piloting the aircraft being connected to avionics of the aircraft to transmit said control instructions that are generated by the processor unit to the avionics, the control instructions being selected by the control unit from a predefined list of control instructions as a function of muscular activity signals generated from muscular activity information detected by said at least one muscular activity sensor.

16. Apparatus including both a control system according to claim 1 and also a remote device comprising a module for operating the apparatus, the user interface being arranged to enable a user of the system to operate the apparatus via the control system and its at least one muscular activity sensor, the module for operating the apparatus being connected to control electronics of the apparatus to transmit said control instructions that are generated by the processor unit to the control electronics of the apparatus, the control instructions being selected by the control unit from a predefined list of control instructions as a function of muscular activity signals generated from muscular activity information detected by said at least one muscular activity sensor.

* * * * *